US012592331B2

(12) United States Patent
Arita

(10) Patent No.: US 12,592,331 B2
(45) Date of Patent: Mar. 31, 2026

(54) HOT ROLLED STEEL SHEET FOR NON ORIENTED ELECTRICAL STEEL SHEET AND PRODUCING METHOD THEREOF

(71) Applicant: NIPPON STEEL CORPORATION, Tokyo (JP)

(72) Inventor: Yoshihiro Arita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 260 days.

(21) Appl. No.: 18/283,149

(22) PCT Filed: Apr. 14, 2021

(86) PCT No.: PCT/JP2021/015433
§ 371 (c)(1),
(2) Date: Sep. 20, 2023

(87) PCT Pub. No.: WO2022/219742
PCT Pub. Date: Oct. 20, 2022

(65) Prior Publication Data

US 2024/0170190 A1 May 23, 2024

(51) Int. Cl.

| | |
|---|---|
| ***C21D 6/00*** | (2006.01) |
| ***C21D 8/12*** | (2006.01) |
| ***C21D 8/1216*** | (2026.01) |
| ***C21D 8/1244*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/14*** | (2006.01) |
| ***H01F 1/153*** | (2006.01) |

(52) U.S. Cl.
CPC ............ *H01F 1/153* (2013.01); *C21D 6/005* (2013.01); *C21D 6/008* (2013.01); *C21D 8/1222* (2013.01); *C21D 8/1261* (2013.01); *C21D 9/46* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C21D 2211/005* (2013.01); *C22C 2202/02* (2013.01)

(58) Field of Classification Search
None
See application file for complete search history.

(56) References Cited

FOREIGN PATENT DOCUMENTS

| | | | | |
|---|---|---|---|---|
| CN | 101914732 | A | | 12/2010 |
| CN | 105779731 | A | | 7/2016 |
| JP | 54-163720 | A | | 12/1979 |
| JP | 63-195217 | A | | 8/1988 |
| JP | 3-104844 | A | | 5/1991 |
| JP | 10-46245 | A | | 2/1998 |
| JP | 2001-064756 | A | | 3/2001 |
| JP | 2004-2954 | A | | 1/2004 |
| JP | 2005-002401 | A | | 1/2005 |
| JP | 2005-179710 | A | | 7/2005 |
| JP | 2006124809 | A | * | 5/2006 |
| WO | WO 2005/100627 | A1 | | 10/2005 |

* cited by examiner

*Primary Examiner* — Jenny R Wu
(74) *Attorney, Agent, or Firm* — Birch, Stewart, Kolasch & Birch, LLP

(57) ABSTRACT

A hot rolled steel sheet is for a non oriented electrical steel sheet, wherein an amount of solid-soluted Ti is 0.0005% or less, Ti carbides with an equivalent circle diameter of 10 to 50 nm exist in a grain and at a grain boundary of a ferrite grain, 10 to 100 number % of the Ti carbides which exist in the grain are compositely precipitated with a Mn sulfide, and a number density of the Ti carbides which exist at the grain boundary is 0.1 pieces/μm or less.

6 Claims, 1 Drawing Sheet

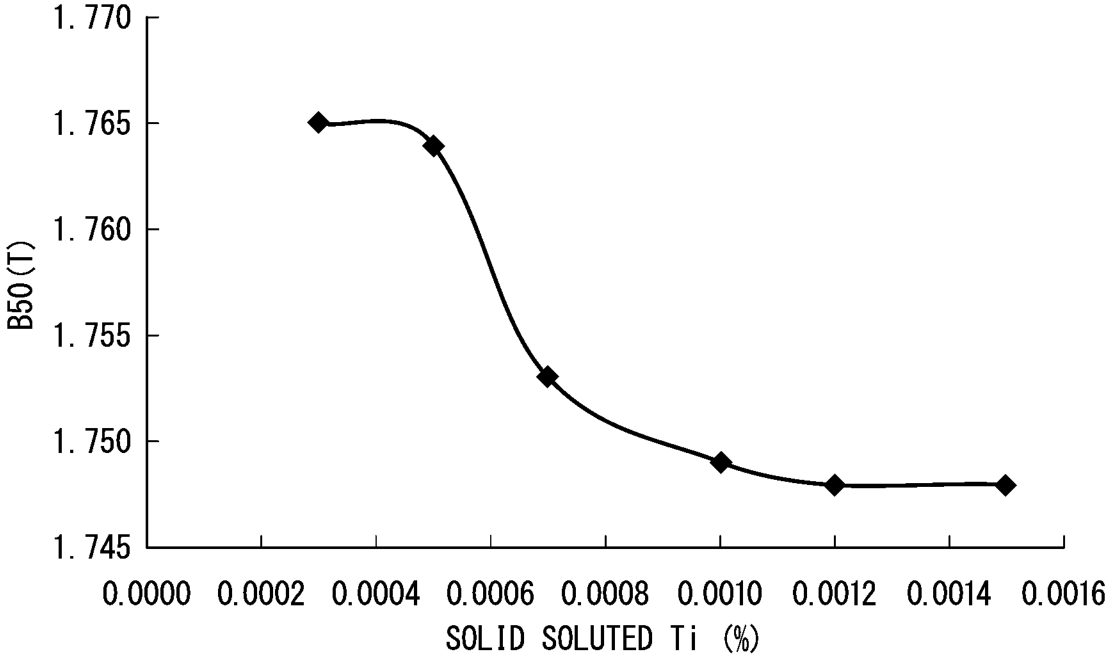
1. 770
1. 765
1. 760
1. 755
1. 750
1. 745
B50(T)
0.0000
0.0002
0.0004
0.0006
0.0008
0.0010
0.0012
0.0014
0.0016
SOLID SOLUTED Ti (%)

HOT ROLLED STEEL SHEET FOR NON ORIENTED ELECTRICAL STEEL SHEET AND PRODUCING METHOD THEREOF

TECHNICAL FIELD

The present invention relates to a hot rolled steel sheet for a non oriented electrical steel sheet and a producing method thereof.

BACKGROUND ART

In recent years, due to the increasing worldwide demand for energy saving in electrical equipment, it is required to further improve the performance of non oriented electrical steel sheets used as core materials for rotating machines.

For high-efficiency model among motors of electrical products, high grade non oriented electrical steel sheets are used. In general, for the high-grade non oriented electrical steel sheets, the electrical resistance are increased by increasing Si and Al content, and the grain size is controlled to be coarse.

On the other hand, for general purpose model among motors of electrical products, normal grade non oriented electrical steel sheets are used. In recent years, it is required to improve the performance even for the general purpose model of motors. However, since the required cost is severe for the general purpose model, it is difficult to switch a non oriented electrical steel sheet to the high grade type like the high-efficiency model.

In general, the normal grade non oriented electrical steel sheet has a chemical composition in which a Si content is lower. In the normal grade non oriented electrical steel sheet, for instance, grain growth is made to be promoted during stress relief annealing performed after punching to be a motor core shape, and thereby, iron loss characteristics are tried to be improved.

As a method for improving the grain growth during stress relief annealing, the following techniques have been proposed.

For instance, Patent Document 1 discloses a method for producing an electrical steel sheet with excellent magnetic characteristics, the method including making a steel slab containing 0.065% or less of C, 2.0% or less of Si, 0.10% or less of Al, 0.020% or less of O, 0.50 to 2.50 of B/N, and a balance consisting of Fe and unavoidable impurities, hot-rolling the steel slab to obtain a hot rolled sheet, cold-rolling the hot rolled sheet by cold-rolling once or by cold-rolling two times or more with an intermediate annealing to be a final thickness, and then, annealing an obtained sheet.

Patent Document 2 discloses a non oriented electrical steel sheet with 50 μm or more of average grain size after magnetic annealing and with low iron loss, wherein the non oriented electrical steel sheet includes 0.015% or less of C, 0.1 to 1.0%, of Si, 0.001 to 0.005% of sol. Al, 1.5% or less of Mn, 0.008% or less of S, 0.0050% or less of N, 0.02% or less of T. O., and wherein a ratio of weight of MnO to total weight of three types of inclusions $SiO_2$, MnO and $Al_2O_3$ in steel is 15% or less.

Patent Document 3 discloses a non oriented electrical steel sheet with excellent magnetic characteristics, wherein the non oriented electrical steel sheet includes, by mass %, 0.01% or less of C, 0.1 to 2.0% of Si, 0.1 to 1.5% of Mn, and 0.1% or less of Al or 0.05% or less of Zr depending on a deoxidization method of steel, and a balance consisting of Fe and unavoidable impurities, and wherein number of oxides with a diameter of 0.5 to 5 μm is 1000 to 50000 per 1 $cm^2$ in steel.

Patent Document 4 discloses a non oriented electrical steel sheet, wherein the non oriented electrical steel sheet includes, by mass %, 0.0050% or less of C, 0.05 to 3.5% of Si, 3.0% or less of Mn, 3.0% or less of Al, 0.008% or less of S, 0.15% or less of P, 0.0050% or less of N, and 0.2% or less of Cu, wherein (S in Cu sulfides)/(S in steel)≤0.2 or (S in Cu sulfides)/(S in Mn sulfides)≤0.2 is satisfied, and wherein number density of Cu-containing sulfides with a diameter of 0.03 to 0.20 μm is 0.5/$km^3$ or less in steel sheet.

Patent Document 5 discloses a non oriented electrical steel sheet, wherein the non oriented electrical steel sheet includes, by mass %, 1.5% or less of Si, 0.4 to 1.5% of Mn, 0.01 to 0.04% of sol. Al, 0.0015% or less, of Ti 0.0030% or less of N, 0.0010 to 0.0040% of S, 0.5 to 1.5 of B as B/N, and a balance consisting of Fe and unavoidable impurities, wherein 10 number % or more of sulfides containing Mn are precipitated compositely with B precipitates, wherein distribution density in total of MnS, $Cu_2S$, and their composite sulfides is $3.0\times10^5$ pieces/$mm^2$ or less, and wherein distribution density of Ti precipitates with a diameter of less than 0.1 μm is $1.0\times10^3$ pieces/$mm^2$ or less.

RELATED ART DOCUMENTS

Patent Documents

[Patent Document 1] Japanese Unexamined Patent Application, First Publication No. S54-163720
[Patent Document 2] Japanese Unexamined Patent Application, First Publication No. S63-195217
[Patent Document 3] Japanese Unexamined Patent Application, First Publication No. H3-104844
[Patent Document 4] Japanese Unexamined Patent Application, First Publication No. 2004-2954
[Patent Document 5] PCT International Publication No. WO2005/100627

SUMMARY OF INVENTION

Technical Problem to be Solved

The techniques of Patent Documents 1 to 5 try to reduce the iron loss by promoting the grain growth during stress relief annealing. However, in the techniques, a problem newly arises in that the magnetic flux density decreases as the iron loss decreases. As described above, the normal grade non oriented electrical steel sheets in which the chemical composition is limited have a problem that it is difficult to satisfy both low iron loss and high magnetic flux density at a high level.

The present invention has been made in consideration of the above mentioned situations. An object of the invention is to provide a hot rolled steel sheet for a non oriented electrical steel sheet which achieves both low iron loss and high magnetic flux density even when a chemical composition is limited, and a producing method thereof.

Solution to Problem

An aspect of the present invention employs the following.

(1) A hot rolled steel sheet for a non oriented electrical steel sheet according to an aspect of the present invention, the hot rolled steel sheet includes, as a chemical composition, by mass %, 0.0010 to 0.0050% of C,
0.1 to less than 0.5% of Si,
0.1 to 0.5% of Mn,
0.1 to 0.5% of Al,
0.0010 to 0.0030% of total-Ti,
0.0010 to 0.0030% of N,
more than 0.0015 to 0.0040% of S,
0 to 0.0030% of Nb,
0 to 0.0030% of V,
0 to 0.0030% of Zr,
0 to 0.100% of Sn, and
a balance consisting of Fe and impurities, wherein
an amount of solid-soluted Ti is 0.0005% or less,
when viewing an observed surface which is parallel to a rolling direction and a transverse direction,
Ti carbides with an equivalent circle diameter of 10 to 50 nm exist in a grain and at a grain boundary of a ferrite grain,
10 to 100 number % of the Ti carbides which exist in the grain are compositely precipitated with a Mn sulfide, and
a number density of the Ti carbides which exist at the grain boundary is 0.1 pieces/μm or less.

(2) In the hot rolled steel sheet for the non oriented electrical steel sheet according to the above (1),
the hot rolled steel sheet may include, as the chemical composition, by mass %, 0.010 to 0.100% of Sn.

(3) A producing method of the hot rolled steel sheet for the non oriented electrical steel sheet according to the above (1) or (2), the method may include
a casting process of casting a molten steel to obtain a slab including, as a chemical composition, by mass %,
0.0010 to 0.0050% of C,
0.1 to less than 0.5% of Si,
0.1 to 0.5% of Mn,
0.1 to 0.5% of Al,
0.0010 to 0.0030% of total-Ti,
0.0010 to 0.0030% of N,
more than 0.0015 to 0.0040% of S,
0 to 0.0030% of Nb,
0 to 0.0030% of V,
0 to 0.0030% of Z,
0 to 0.100% of Sn, and
a balance consisting of Fe and impurities, and
a hot rolling process of hot-rolling the slab to obtain a hot rolled steel sheet, wherein
in the hot rolling process,
the slab before hot rolling is heated and held in a temperature range of 1150 to 1200° C. for 10 to 60 minutes,
a final pass with a reduction of 20 to 30% is conducted in a final hot rolling, and
a steel sheet after hot rolling is held in a temperature range of 800 to less than 900° C. for 15 to 30 minutes.

Effects of Invention

According to the above aspects of the present invention, it is possible to provide the hot rolled steel sheet for the non oriented electrical steel sheet which achieves both low iron loss and high magnetic flux density even when the chemical composition is limited, and the producing method thereof.

BRIEF DESCRIPTION OF DRAWINGS

FIG. 1 is a graph showing a relationship between an amount of solid-soluted Ti as a hot rolled steel sheet and magnetic flux density B50 after stress relief annealing as a non oriented electrical steel sheet.

DETAILED DESCRIPTION OF PREFERRED EMBODIMENTS

Hereinafter, a preferable embodiment of the present invention is described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" does not include in the limitation range. Unless otherwise noted, "%" of the amount of respective elements expresses "mass %".

The present inventor has investigated the reason why the magnetic flux density after stress relief annealing is lower than that before stress relief annealing regarding Al-added steel containing approximately 0.002% of Ti, focusing on an existence state of Ti.

In general, Al-added steel tends to form coarse AlN in steelmaking process or hot rolling process. The formed coarse AlN itself does not negatively affect the grain growth. However, when the coarse AlN is formed, the amount of N in steel decreases, and the precipitation of TiN is suppressed. When the precipitation of TiN is suppressed as described above, an amount of solid-soluted Ti in steel increases (see FIG. 1).

As a method for decreasing the amount of solid-soluted Ti as the hot rolled steel sheet, it is conceivable to decrease the Ti content as slab. When the Ti content as the slab is decreased, the amount of solid-soluted Ti as the hot rolled steel sheet is also decreased. As a result, the grain growth is stabilized during stress relief annealing as a non oriented electrical steel sheet, and it is possible to suppress the decrease in the magnetic flux density after stress relief annealing. However, Ti contained in the slab is an impurity element. It is unfavorable to decrease the Ti content as the slab to an extent such that it is possible to suppress the decrease in the magnetic flux density described above, because the production cost increases.

For the reason, the present inventor has made a thorough investigation to obtain excellent magnetic characteristics as a normal grade non oriented electrical steel sheet even when Ti is contained in the slab as the impurity. As a result, the present inventor has found that it is favorable to decrease the amount of solid-soluted Ti in steel by making Ti contained as the impurity precipitate as Ti nitrides and Ti carbides as much as possible in the hot rolled steel sheet.

In addition, the present inventor has found that, although the above Ti nitrides are sufficiently coarse of precipitation size and do not negatively affect the grain growth, it is not enough for the above Ti carbides to make it simply precipitate and it is necessary to control the precipitation state. For instance, it has been found that Ti carbides and Mn sulfides are made to be compositely precipitated in the hot rolled steel sheet, the number of Ti carbides which precipitate incompositely at grain boundary is made to decrease, and thereby, it is possible to stably grow the grain during stress relief annealing in the non oriented electrical steel sheet. The idea is explained below.

First, in order to decrease the amount of solid-soluted Ti in the hot rolled steel sheet, it is necessary to precipitate Ti in steel as Ti nitrides. As a result of investigation, it has been found that, when the slab before hot rolling is favorably heated under control, TiN is preferentially precipitated with AlN, and the amount of solid-soluted Ti in the hot rolled steel sheet can be decreased to some extent. In order to preferentially precipitate TiN with AlN as described above, the slab before hot rolling may be heated to a temperature range of 1150 to 1200° C. and held in the temperature range for 10 to 60 minutes.

However, it is not enough to only make Ti in steel precipitate as Ti nitrides described above. In order to decrease the amount of solid-soluted Ti in the hot rolled steel sheet, it is necessary to further make Ti in steel precipitate as Ti carbides. At the time, it is necessary to suppress that Ti carbides precipitate incompositely at the grain boundary of ferrite by making it precipitate compositely with Mn sulfides in the grain of ferrite, so as not to suppress the grain growth. As a result of the investigation, it has been found that Ti carbides can be precipitated in a favorable state by controlling a reduction of final pass in final hot rolling and by controlling a temperature of steel sheet after hot rolling. In order to favorably precipitate Ti carbides as described above, the final pass with the reduction of 20 to 30% may be conducted in the final hot rolling, and the steel sheet after hot rolling may be held in a temperature range of 800 to less than 900° C. for 15 to 30 minutes.

As described above, Ti in steel is made to precipitate as TiN by controlling the temperature before hot rolling, and Ti in steel is made to further precipitate as TiC by controlling the rolling in the final pass of final hot rolling and by controlling the temperature after hot rolling. As a result, the amount of solid-soluted Ti decreases in the hot rolled steel sheet, the grain growth during stress relief annealing becomes stable as the non oriented electrical steel sheet, and thereby, both low iron loss and high magnetic flux density are obtained.

TiN which is precipitated by controlling the temperature before hot rolling is sufficiently coarse of precipitation size and does not negatively affect the grain growth. On the other hand, TiC which is precipitated at the grain boundary significantly deteriorates the grain growth, but TiC which is precipitated compositely on Mn sulfides in the grain does not deteriorate the grain growth. Thus, it is necessary to suppress that TiC precipitates incompositely at the grain boundary of ferrite by making it precipitate compositely with sulfides in the grain of ferrite.

Specifically, in the hot rolled steel sheet for the non oriented electrical steel sheet according to the embodiment, on the premise of the decrease in the amount of solid-soluted Ti by making Ti in steel precipitate as Ti nitrides and Ti carbides, the precipitation state of Ti carbides is controlled so as not to suppress the grain growth. As a result, it is possible to satisfy both low iron loss and high magnetic flux density at a high level, even when the chemical composition is limited as the normal grade.

Moreover, in the hot rolled steel sheet for the non oriented electrical steel sheet according to the embodiment, since it is premised on the decrease in the amount of solid-soluted Ti, it is preferable to decrease the amount of Nb, V, and Zr which are elements forming nitrides other than Ti, so that N in steel is not consumed unnecessarily. For instance, each amount of Nb, V, and Zr may be 0.0030% or less.

<Chemical Composition of Hot Rolled Steel Sheet>

Herein, in regard to the hot rolled steel sheet for the non oriented electrical steel sheet according to the embodiment, the limitation reasons of the chemical composition are described.

In the embodiment, the hot rolled steel sheet includes, as the chemical composition, base elements, optional elements as necessary, and the balance consisting of Fe and impurities.

C (carbon) is a base element. When the C content is excessive, the iron loss of non oriented electrical steel sheet deteriorates by magnetic aging. Thus, the C content is to be 0.0050% or less. On the other hand, from the viewpoint of suppressing an increase in solid-soluted B, the C content is to be 0.0010% or more. The C content may be 0.0045% or less, 0.0040% or less, or 0.0035% or less. Also, the C content may be 0.0015% or more, 0.0020% or more, or 0.0025% or more.

Si (silicon) is a base element. Si is an element which has an effect of increasing the electrical resistance of non oriented electrical steel sheet. However, when the Si content is excessive, the hardness of non oriented electrical steel sheet increases, the magnetic flux density decreases, and the cost increases. The Si content is to be less than 0.5% as the chemical composition of normal grade. The Si content may be 0.4% or less. On the other hand, in order to obtain the above effects, the Si content is to be 0.1% or more. The Si content may be 0.20% or more.

Mn (manganese) is a base element. Mn is a sulfide forming element and is preferably included in an appropriate amount from the viewpoint of promoting the grain growth. Thus, the Mn content is to be 0.1% or more. The Mn content may be 0.20% or more. On the other hand, the Mn content is to be 0.5% or less in consideration of the microstructure control as the hot rolled steel sheet and the decrease in the saturation flux density as the non oriented electrical steel sheet. The Mn content may be 0.4% or less.

Al (aluminum) is a base element. Ai is an element which deoxidizes the steel. From the viewpoint of ensuring a stable deoxidizing effect and from the viewpoint of suppressing the formation of fine AlN, the Al content is to be 0.1% or more. On the other hand, when the Al content is excessive, AlN precipitates preferentially over TiN, and the decrease in the amount of solid-soluted Ti resulted from TiN precipitation is suppressed. Thus, the Al content is to be 0.5% or less. Preferably, the Al content may be 0.3% or less, or 0.2% or less.

Ti (titanium) is an element contaminated in the slab. Decreasing the Ti content to zero results in an increase in the production cost. Thus, the amount of total-Ti is to be 0.0010% or more as the chemical composition of normal grade. The amount of total-Ti may be more than 0.0020%. On the other hand, when the amount of total-Ti is excessive, it becomes difficult to decrease the amount of solid-soluted Ti. Thus, the amount of total-Ti is to be 0.0030% or less. Herein, the total-Ti corresponds to Ti in total of the solid-soluted Ti in steel and Ti included in the precipitates such as TiN and TiC.

Nb (niobium) is an optional element. Since Nb consumes N in steel by forming the nitrides, the decrease in the amount of solid-soluted Ti resulted from TiN precipitation may be suppressed. However, Nb is an element contaminated in the slab. Excessively decreasing the Nb content to zero results in the increase in the production cost. Thus, the Nb content is to be 0.0030% or less in consideration of TiN precipitation and the production cost. Preferably, the Nb content may be 0.0025% or less, 0.0020% or less, or 0.0015% or less. It is preferable that the Nb content is lower, and the lower limit thereof may be 0%. Considering industrial productivity, the Nb content may be 0.0001% or more, 0.0005% or more, or 0.0010% or more.

V (vanadium) is an optional element. Since V consumes N in steel by forming the nitrides, the decrease in the amount of solid-soluted Ti resulted from TiN precipitation may be suppressed. However, V is an element contaminated in the slab. Excessively decreasing the V content to zero results in the increase in the production cost. Thus, the V content is to be 0.0030% or less in consideration of TiN precipitation and the production cost. Preferably, the V content may be 0.0025% or less, 0.0020% or less, or 0.0015% or less. It is preferable that the V content is lower, and the lower limit thereof may be 0%. Considering industrial productivity, the V content may be 0.0001% or more, 0.0005% or more, or 0.0010% or more.

Zr (zirconium) is an optional element. Since Zr consumes N in steel by forming the nitrides, the decrease in the amount of solid-soluted Ti resulted from TiN precipitation may be suppressed. However, Zr is an element contaminated in the slab. Excessively decreasing the Zr content to zero results in the increase in the production cost. Thus, the Zr content is to be 0.0030% or less in consideration of TiN precipitation and the production cost. Preferably, the Zr content may be 0.0025% or less, 0.0020% or less, or 0.0015% or less. It is preferable that the Zr content is lower, and the lower limit thereof may be 0%. Considering industrial productivity, the Zr content may be 0.0001% or more, 0.0005% or more, or 0.0010% or more.

N (nitrogen) is a base element which forms the nitrides. In general, it is considered that the nitrides negatively affect the grain growth for the non oriented electrical steel sheet. However, the present inventor has found that it is possible to suppress the decrease in the magnetic flux density after stress relief annealing by fixing Ti as Ti nitrides such as TiN using N and by decreasing the amount of solid-soluted Ti in the hot rolled steel sheet. Thus, the N content is to be 0.0010% or more. The N content may be 0.0012% or more, 0.0015% or more, or 0.0020% or more. On the other hand, when N is excessively included, the grain growth is suppressed, which is not preferable. Thus, the N content is to be 0.0030% or less. The N content may be 0.0025% or less.

S (sulfur) is a base element which forms Mn sulfide. In general, it is considered that the sulfides negatively affect the grain growth for the non oriented electrical steel sheet, and thus, the S content is to decrease as much as possible. However, the present inventor has found that an appropriate amount of sulfides acts as nuclei for precipitating TiC and makes TiC harmless. Typical TiC precipitates at the grain boundary of ferrite grain before grain growth, and significantly deteriorates the grain growth. On the other hand, TiC precipitated compositely on the sulfides precipitates in the grain of ferrite, and thereby, the grain growth is not negatively affected. In order to make TiC precipitate compositely on the sulfides, the S content is to be more than 0.0015%. The S content may be 0.0020% or more, or more than 0.0020%. On the other hand, when S is included excessively, the grain growth is suppressed, which is not preferable. In particular, when the S content is more than 0.0040%, the precipitation amount of sulfides increases and the grain growth is suppressed. Thus, the S content is to be 0.0040% or less. The S content may be 0.0035% or less, 0.0030% or less, or 0.0025% or less.

Sn (tin) is an optional element. A lower limit of the Sn content may be 0%. However, Sn is effective in improving the magnetic flux density. In addition, Sn is also effective in suppressing nitridation and oxidation of a surface of steel sheet during annealing. Thus, Sn may be included as necessary. For instance, the Sn content may be 0.010% or more, 0.020% or more, or 0.050% or more. On the other hand, when the Sn content is excessive, the effect saturates. Thus, the Sn content may be 0.100% or less, 0.090% or less, or 0.080% or less.

The remainder of the chemical composition consists of Fe and impurities. The impurities are elements which do not impair the effect of the embodiment even when it is contained and correspond to elements which are contaminated during industrial production of steel sheet from ores and scrap that are used as a raw material of steel, or from environment of a production process. For instance, the upper limit of the total content of impurities may be 5%.

The chemical composition as described above may be measured by typical analytical methods for the steel. For instance, the chemical composition may be measured by using ICP-AES (Inductively Coupled Plasma-Atomic Emission Spectrometer: inductively coupled plasma emission spectroscopy spectrometry). Specifically, it is possible to obtain the chemical composition by conducting the measurement by Shimadzu ICPS-8100 and the like (measurement device) under the condition based on calibration curve prepared in advance using samples with 35 mm square taken from the steel sheet. In addition, C may be measured by the infrared absorption method after combustion, and N may be measured by the thermal conductometric method after fusion in a current of inert gas.

<Ti Carbides>

Next, in regard to the hot rolled steel sheet for the non oriented electrical steel sheet according to the embodiment, the features of Ti carbides (TiC) are described.

As described above, in the embodiment, Ti precipitates included in the hot rolled steel sheet is controlled by comprehensively and inseparably controlling the chemical composition and the production conditions. In particular, in the embodiment, it is suppressed that Ti carbides precipitate incompositely at the grain boundary of ferrite.

In the hot rolled steel sheet for the non oriented electrical steel sheet according to the embodiment, when viewing an observed surface which is parallel to a rolling direction and a transverse direction, Ti carbides with an equivalent circle diameter of 10 to 50 nm exist in the grain and at the grain boundary of the ferrite grain, 10 to 100 number % of Ti carbides which exist in the grain are compositely precipitated with Mn sulfide, and a number density of Ti carbides which exist at the grain boundary is 0.1 pieces/μm or less.

In the embodiment, Ti carbides with the equivalent circle diameter of 10 to 50 nm are controlled as the size of Ti Carbide which remarkably influences the grain growth. In the hot rolled steel sheet for the non oriented electrical steel sheet according to the embodiment, Ti carbides with the above size are included in the grain and at the grain boundary of the ferrite grain.

When 10 to 100 number % of Ti carbides among Ti carbides which exist in the ferrite grain are precipitated compositely with Mn sulfides, it is possible to control the number density of the above Ti carbides which precipitate incompositely at the grain boundary of ferrite to be 0.1 pieces/μm or less. It is preferable that 20 number % or more, 30 number % or more, 40 number % or more, or 50 number % or more of Ti carbides among Ti carbides which exist in the ferrite grain are precipitated compositely with Mn sulfides.

When the number density of Ti carbides which exist at the grain boundary of ferrite is 0.1 pieces/μm or less, the grain growth is not suppressed. The number density of Ti carbides which exist at the grain boundary is preferably 0.05 pieces/

μm or less, 0.01 pieces/μm or less, or 0.005 pieces/μm or less. It is preferable that the number density of Ti carbides which exist at the grain boundary is lower, and the lower limit thereof may be zero.

The method for evaluating Ti carbides which exist in the grain and at the grain boundary of the ferrite grain is as follows.

(1) The hot rolled steel sheet is cut along the rolling direction and the transverse direction, and small pieces are taken. The surface of the small piece (rolled surface parallel to the rolling direction and the transverse direction) is polished to an arbitrary depth, the back surface of the small piece (opposite rolled surface) is also polished, and thereby, the small piece is made to be a thin film.

(2) The polished surface is observed using a transmission electron microscope, it is identified whether the site where the inclusions with the equivalent circle diameter of 10 to 50 nm exist is in the grain or at the grain boundary.

(3) The composition of each inclusion is measured by an EDS (energy dispersive X-ray spectroscopy) attached to the transmission electron microscope.

(4) The inclusion where an atomic ratio of Mn and S is approximately 1:1 is regarded as Mn sulfide, the inclusion where an atomic ratio of Ti and C is approximately 1:1 is regarded as Ti carbide, and the numbers thereof are counted. In addition, the numbers of the inclusion where the above Mn sulfide and the above Ti carbide are compositely precipitated are counted.

(5) Based on the above counting results, the number percentage of Ti carbides which precipitate compositely with Mn sulfides in the grain of ferrite is calculated.

(6) Similarly, the number density of Ti carbides which exist in contact with the grain boundary of ferrite is calculated. The number density is to be a value obtained by dividing the number of Ti carbides which exist in contact with the grain boundary of ferrite by the total length of the grain boundary.

Herein, the area of the measurement region is to be at least 100 $\mu m^2$. In so far as the total measurement area is at least 100 $\mu m^2$, the number of measurement points and the size of visual field for measurement are not particularly limited.

<Amount of Solid-Soluted Ti>

Next, in regard to the hot rolled steel sheet for the non oriented electrical steel sheet according to the embodiment, the amount of solid-soluted Ti is described.

In the hot rolled steel sheet for the non oriented electrical steel sheet according to the embodiment, the amount of solid-soluted Ti in steel is decreased by making Ti in steel precipitate as Ti nitrides and Ti carbides. Specifically, in the hot rolled steel sheet for the non oriented electrical steel sheet according to the embodiment, the amount of solid-soluted Ti is to be 0.0005% or less in unit of mass %. When the amount of solid-soluted Ti is 0.0005% or less in the hot rolled steel sheet, it is possible to suppress the decrease in the magnetic flux density after stress relief annealing for the non oriented electrical steel sheet. Thus, it is possible to satisfy both low iron loss and high magnetic flux density at a high level, even when the chemical composition is limited as the normal grade. The amount of solid-soluted Ti is preferably 0.0003% or less, or 0.0001% or less. It is preferable that the amount of solid-soluted Ti is lower, and the lower limit thereof may be zero.

In order to decrease the amount of solid-soluted Ti, Ti in steel is made to precipitate as Ti nitrides and Ti carbides, but the Ti nitrides are sufficiently coarse of precipitation size and do not negatively affect the grain growth. Thus, in the hot rolled steel sheet for the non oriented electrical steel sheet according to the embodiment, in so far as the amount of solid-soluted Ti is 0.0005% or less, the precipitation state (for instance, size, number density, and the like) of Ti nitrides is not limited. On the other hand, Ti carbides negatively affect the grain growth. Thus, in the hot rolled steel sheet for the non oriented electrical steel sheet according to the embodiment, in addition that the amount of solid-soluted Ti is 0.0005% or less, the precipitation state of Ti carbides is controlled as described above.

The method for quantifying the solid-soluted Ti is as follows.

(1) The amount of total-Ti (total amount of Ti included in Ti precipitates and the solid-soluted Ti) in the hot rolled steel sheet is determined by chemical analysis.

(2) The hot rolled steel sheet is dissolved by an electrolytic method and the residue is extracted.

(3) The composition of the residue is analyzed by ICP and the amount of Ti in the residue is obtained.

(4) A value obtained by subtracting the amount of Ti in the Ti precipitates of the hot rolled steel sheet from the amount of total-Ti in the hot rolled steel sheet is regarded as the amount of solid-soluted Ti in the hot rolled steel sheet.

In the electrolytic method, both Ti nitrides and Ti carbides can be extracted as the residue. Thus, the difference between the amount of Ti in the residue obtained by the electrolytic method and the amount of total-Ti in the hot rolled steel sheet can be regarded as the amount of solid-soluted Ti in the hot rolled steel sheet.

<Average Grain Size>

In the hot rolled steel sheet according to the embodiment, an average grain size is not particularly limited. However, in the non oriented electrical steel sheet which is subjected to punching, when the average grain size is fine, the occurrence of burr during punching is suppressed, and the workability is improved. Thus, in the non oriented electrical steel sheet after final annealing and before stress relief annealing, the average grain size may be 30 μm or less.

In order to control the average grain size to be 30 μm or less in the non oriented electrical steel sheet after final annealing and before stress relief annealing by using the hot rolled steel sheet according to the embodiment, conventional techniques may be appropriately used. The average grain size of the non oriented electrical steel sheet after final annealing and before stress relief annealing may be measured by a method of observing a cross section of the steel sheet with an optical microscope and counting grains passing through a straight line drawn in a thickness direction (so-called counting method specified in Annex B of JIS G 0551:2013).

<Producing Method of Hot Rolled Steel Sheet>

Next, the producing method of the hot rolled steel sheet for the non oriented electrical steel sheet according to the embodiment is described.

The producing method of the hot rolled steel sheet according to the embodiment includes a casting process of casting a molten steel to obtain a slab including, as a chemical composition, by mass %, 0.0010 to 0.0050% of C, 0.1 to less than 0.5% of Si, 0.1 to 0.5% of Mn, 0.1 to 0.5% of Al, 0.0010 to 0.0030% of total-Ti, 0.0010 to 0.0030% of N, more than 0.0015 to 0.0040% of S,
0 to 0.0030% of Nb,
0 to 0.0030% of V,
0 to 0.0030% of Zr,
0 to 0.100% of Sn, and
a balance consisting of Fe and impurities, and
a hot rolling process of hot-rolling the slab to obtain a hot rolled steel sheet, wherein
in the hot rolling process,
the slab before hot rolling is heated and held in a temperature range of 1150 to 1200° C. for 10 to 60 minutes,
a final pass with a reduction of 20 to 30% is conducted in a final hot rolling, and
a steel sheet after hot rolling is held in a temperature range of 800 to less than 900° C. for 15 to 30 minutes.

In the casting process, the slab is obtained by casting molten steel which is refined so that the chemical composition of the finally obtained hot rolled steel sheet is within the above range. The chemical composition of slab is the same as the chemical composition of the hot rolled steel sheet described above. In the hot rolled steel sheet according to the embodiment, the amount of solid-soluted Ti is particularly important, and is controlled in the subsequent hot rolling process (hot rolling) and the like. Thus, the production conditions in steelmaking process are not particularly limited, and known production conditions may be appropriately applied.

In the hot rolling process, the slab after the casting process is hot-rolled to obtain the hot rolled steel sheet. The hot rolling process is important for controlling the precipitates in order to control the amount of solid-soluted Ti.

First, it is necessary to suppress the formation of AlN and promote the precipitation of TiN. For the purpose, the slab before hot rolling is heated to the temperature range of 1150 to 1200° C., is held in the temperature range for 10 to 60 minutes, and thereafter, is subjected to the hot rolling.

Although the precipitation of TiN is promoted by the above heating conditions, some Ti remains as the solid-solution state in the steel sheet after hot rolling (hot rolled steel sheet) only under the above heating conditions. Thus, it is necessary to promote the precipitation of TiC. However, it is necessary to control TiC not to precipitate incompositely at the grain boundary of ferrite at the time of precipitating TiC.

Thus, the final pass with the reduction of 20 to 30% is conducted in the final hot rolling, and the steel sheet after hot rolling is held in the temperature range of 800 to less than 900° C. for 15 to 30 minutes. Thereby, TiC is made to precipitate compositely with Mn sulfides which is formed during hot rolling and acts as nuclei. When the above conditions are satisfied, TiC is precipitated compositely with Mn sulfides in the grain of ferrite, and it is possible to suppress that TiC is precipitated incompositely at the grain boundary of ferrite. Specifically, the number percentage of TiC which precipitates compositely with Mn sulfides in the grain of ferrite becomes 10 to 100 number %, and the number density of TiC which precipitates incompositely at the grain boundary of ferrite becomes 0.1 pieces/km or less. As a result of controlling the precipitates, it is possible to control the amount of solid-soluted Ti in the hot rolled steel sheet to be 0.0005% or less. Thus, the grain growth is stabilized during stress relief annealing, and it is possible to satisfy both low iron loss and high magnetic flux density at a high level, even when the chemical composition is limited as the normal grade.

When the reduction in the final pass of finial hot rolling is less than 20% or more than 30%, TiC is finely precipitated incompositely, and the grain growth becomes unstabilized during stress relief annealing. Also, when the temperature of holding after hot rolling is 800° C. or less, TiC is finely precipitated incompositely, and the grain growth becomes unstabilized during stress relief annealing. On the other hand, when the temperature of holding is more than 900° C., it is difficult that the solid-soluted Ti is precipitated. In addition, when the holding time is less than 15 minutes or more than 30 minutes and even when the temperature of holding is 800 to 900° C., the composite precipitation does not occur sufficiently, and the grain growth becomes unstabilized during stress relief annealing.

<Producing Method of Non Oriented Electrical Steel Sheet>

Next, the producing method of the non oriented electrical steel sheet using the hot rolled steel sheet for the non oriented electrical steel sheet according to the embodiment is described.

The producing method of the non oriented electrical steel sheet according to the embodiment is for producing the non oriented electrical steel sheet using the hot rolled steel sheet explained above, and the method includes
pickling and cold-rolling the hot rolled steel sheet produced by satisfying the production conditions described above without conducting the hot-rolled sheet annealing, and
heating the cold rolled sheet after the cold rolling at a heating rate of 20° C./second or more and holding it at a temperature of 850° C. or less.

As described above, the hot rolled steel sheet produced through the casting process and the hot rolling process is subjected to the pickling process, the cold rolling process (cold rolling), and the final annealing process without conducting the hot-rolled sheet annealing. Among the above processes, the production conditions in the pickling process and the cold rolling process are not particularly limited, and known production conditions may be appropriately applied.

The final annealing process is a process of heating, holding, and cooling the cold rolled steel sheet after cold rolling. The production conditions in the final annealing process are not particularly limited, and known production conditions may be appropriately applied. However, it is possible to increase the magnetic flux density of the non oriented electrical steel sheet by using the hot rolled steel sheet for the non oriented electrical steel sheet according to the embodiment and by controlling the heating rate of the steel sheet to be 20° C./second or more in the heating stage of the final annealing process. Thus, the heating rate in the heating stage of the final annealing process may be 20° C./second or more. Herein, the heating rate is a value obtained by dividing the difference between the heating start temperature and the holding temperature of the hot rolled steel sheet by the time required from the heating start temperature to the holding temperature. In other word, the heating rate corresponds to the average heating rate from the heating start temperature to the holding temperature.

Moreover, it may be specified that the annealing temperature (holding temperature) is not more than 850° C. in the holding stage of the final annealing process. When the annealing temperature is more than 850° C., TiC in the composite precipitates of TiC and sulfides controlled in the hot rolling process may become the solid-soluted Ti again, and the grain growth may become unstabilized. Thus, the heating rate in the heating stage of the final annealing process is preferably 20° C./second or more, and the annealing temperature in the holding stage of the final annealing process is preferably 850° C. or less.

The non oriented electrical steel sheet obtained through the above processes can be suitably used as the material for electrical products such as motors. When the material of motor is produced, the non oriented electrical steel sheet is subjected to machining such as punching and stress relief annealing. Conditions of the stress relief annealing are typically an annealing temperature of 750° C. and a holding time of 2 hours. However, the annealing temperature and the time may be appropriately changed in consideration of both equipment restrictions and promotion of the grain growth.

EXAMPLES

The effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

A slab in which the chemical composition was controlled was hot-rolled, and a hot rolled steel sheet with a thickness of 2.5 mm was coiled. The chemical composition of the hot rolled steel sheet is shown in Table 1A to Table 1B, and conditions of the hot rolling are shown in Table 2A to Table 2E. The chemical composition of the slab and the chemical composition of the hot rolled steel sheet were substantially the same except for the amount of solid-soluted Ti.

The amount of solid-soluted Ti and Ti carbides of the produced hot rolled steel sheet were analyzed on the basis of the above method. The results are shown in Tables 3A to Table 3E.

The produced hot rolled steel sheet was pickled, was cold-rolled to 0.5 mm to obtain a cold rolled steel sheet, and was final-annealed under conditions shown in Table 2A to Table 2E to obtain the non oriented electrical steel sheet.

In order to confirm whether or not the non oriented electrical steel sheet obtained by the above processes was the non oriented electrical steel sheet with (A) low iron loss after stress relief annealing and (B) high magnetic flux density after stress relief annealing, the characteristics were evaluated according to the following procedure and acceptance criteria.

(A) Iron Loss after Stress Relief Annealing

The iron loss (W15/50, W15/60) of the steel sheet after stress relief annealing (annealing temperature 750° C. and holding time 2 hours) was measured in accordance with JIS C 2552:2014 "Non oriented electrical steel strip". Then, the iron loss was separated by the dual frequency method. When the hysteresis loss of W15/50 was 2.6 W/kg or less in the non oriented electrical steel sheet after stress relief annealing, it was judged that the iron loss after stress relief annealing was excellent.

Dual Frequency Method

α: Divide the iron loss value of W15/50 by the frequency 50

β: Divide the iron loss value of W15/60 by the frequency 60

$$\text{Hysteresis loss of } W15/50 = \alpha \times 50 - (\beta - \alpha) \times 250$$

(B) Magnetic Flux Density after Stress Relief Annealing

The magnetic flux density ($B_{50}$) of the steel sheet after stress relief annealing (annealing temperature 750° C. and holding time 2 hours) was measured in accordance with JIS C 2552:2014 "Non oriented electrical steel strip". When $B_{50}$/Bs which was a value obtained by dividing B50 by the saturation flux density Bs was 0.820 or more in the non oriented electrical steel sheet, it was judged that the magnetic flux density after stress relief annealing was excellent.

Herein, the saturation flux density Bs of the steel sheet is obtained by substituting the chemical composition of the steel sheet into the following formula.

$$\text{Saturation flux density } Bs = 2.1561 - 0.0413 \times \text{Si} - 0.0198 \times \text{Mn} - 0.0604 \times \text{Al}$$

The evaluation results are also shown in Table 3A to Table 3E. As shown in Table 1A to Table 3E, the inventive examples satisfied the chemical composition, the amount of solid-soluted Ti, and Ti carbides, and thus, both low iron loss and high magnetic flux density were satisfied. On the other hand, the comparative examples did not satisfy at least one of the chemical composition, the amount of solid-soluted Ti, or Ti carbides, and thus, both low iron loss and high magnetic flux density were not satisfied.

TABLE 1A

| STEEL | CHEMICAL COMPOSITION OF HOT ROLLED STEEL SHEET (IN UNITS OF MASS %, BALANCE CONSISTING OF Fe AND IMPURITIES) | | | | | | | | | | | SATURATION FLUX DENSITY |
|---|---|---|---|---|---|---|---|---|---|---|---|---|
| TYPE | C | Si | Mn | S | Al | t-Ti | Nb | V | Zr | N | Sn | Bs |
| A1 | 0.0050 | 0.21 | 0.20 | 0.0032 | 0.14 | 0.0022 | 0.0012 | 0.0013 | 0.0021 | 0.0021 | — | 2.135 |
| A2 | 0.0030 | 0.25 | 0.12 | 0.0028 | 0.22 | 0.0012 | 0.0013 | 0.0014 | 0.0005 | 0.0022 | — | 2.130 |
| A3 | 0.0020 | 0.34 | 0.10 | 0.0027 | 0.35 | 0.0011 | 0.0004 | 0.0012 | 0.0017 | 0.0022 | — | 2.119 |
| A4 | 0.0023 | 0.48 | 0.23 | 0.0022 | 0.44 | 0.0018 | 0.0021 | 0.0025 | 0.0007 | 0.0025 | — | 2.105 |
| A5 | 0.0025 | 0.30 | 0.33 | 0.0040 | 0.45 | 0.0019 | 0.0005 | 0.0003 | 0.0013 | 0.0026 | — | 2.110 |
| A6 | 0.0035 | 0.15 | 0.15 | 0.0039 | 0.10 | 0.0023 | 0.0023 | 0.0017 | 0.0015 | 0.0021 | — | 2.141 |
| A7 | 0.0040 | 0.18 | 0.24 | 0.0031 | 0.50 | 0.0027 | 0.0009 | 0.0018 | 0.0017 | 0.0022 | — | 2.114 |
| A8 | 0.0045 | 0.22 | 0.33 | 0.0022 | 0.22 | 0.0030 | 0.0018 | 0.0009 | 0.0006 | 0.0011 | — | 2.127 |
| A9 | 0.0015 | 0.29 | 0.26 | 0.0018 | 0.20 | 0.0025 | 0.0030 | 0.0022 | 0.0018 | 0.0013 | — | 2.127 |
| A10 | 0.0010 | 0.38 | 0.34 | 0.0032 | 0.14 | 0.0016 | 0.0019 | 0.0030 | 0.0021 | 0.0014 | — | 2.125 |
| A11 | 0.0013 | 0.45 | 0.41 | 0.0021 | 0.31 | 0.0014 | 0.0022 | 0.0024 | 0.0030 | 0.0022 | — | 2.111 |
| A12 | 0.0033 | 0.40 | 0.45 | 0.0017 | 0.44 | 0.0021 | 0.0003 | 0.0002 | 0.0004 | 0.0030 | — | 2.104 |
| A13 | 0.0048 | 0.42 | 0.22 | 0.0029 | 0.32 | 0.0013 | 0.0025 | 0.0028 | 0.0027 | 0.0023 | 0.010 | 2.115 |
| A14 | 0.0032 | 0.45 | 0.26 | 0.0031 | 0.22 | 0.0022 | 0.0005 | 0.0004 | 0.0024 | 0.0018 | 0.100 | 2.119 |
| A15 | 0.0022 | 0.35 | 0.45 | 0.0025 | 0.36 | 0.0024 | 0.0016 | 0.0016 | 0.0021 | 0.0016 | 0.035 | 2.111 |
| A16 | 0.0031 | 0.44 | 0.47 | 0.0020 | 0.23 | 0.0015 | 0.0015 | 0.0018 | 0.0022 | 0.0028 | 0.065 | 2.115 |

TABLE 1B

| STEEL TYPE | C | Si | Mn | S | Al | t-Ti | Nb | V | Zr | N | Sn | SATURATION FLUX DENSITY Bs |
|---|---|---|---|---|---|---|---|---|---|---|---|---|
| | CHEMICAL COMPOSITION OF HOT ROLLED STEEL SHEET (IN UNITS OF MASS %, BALANCE CONSISTING OF Fe AND IMPURITIES) | | | | | | | | | | | |
| a1 | 0.0060 | 0.50 | 0.22 | 0.0034 | 0.12 | 0.0022 | 0.0021 | 0.0024 | 0.0020 | 0.0011 | — | 2.124 |
| a2 | 0.0022 | 1.60 | 0.33 | 0.0043 | 0.22 | 0.0023 | 0.0022 | 0.0026 | 0.0010 | 0.0023 | — | 2.070 |
| a3 | 0.0033 | 0.32 | 2.00 | 0.0031 | 0.34 | 0.0024 | 0.0023 | 0.0013 | 0.0011 | 0.0021 | — | 2.083 |
| a4 | 0.0032 | 0.55 | 1.60 | 0.0024 | 0.33 | 0.0026 | 0.0004 | 0.0017 | 0.0024 | 0.0013 | — | 2.082 |
| a5 | 0.0022 | 0.67 | 0.45 | 0.0045 | 0.45 | 0.0021 | 0.0006 | 0.0014 | 0.0006 | 0.0026 | — | 2.092 |
| a6 | 0.0024 | 0.89 | 0.43 | 0.0027 | 0.03 | 0.0022 | 0.0021 | 0.0006 | 0.0021 | 0.0022 | — | 2.109 |
| a7 | 0.0034 | 0.99 | 0.32 | 0.0025 | 0.60 | 0.0026 | 0.0022 | 0.0005 | 0.0015 | 0.0014 | — | 2.073 |
| a8 | 0.0033 | 0.33 | 0.56 | 0.0021 | 0.43 | 0.0033 | 0.0011 | 0.0013 | 0.0013 | 0.0017 | — | 2.105 |
| a9 | 0.0043 | 0.44 | 0.78 | 0.0020 | 0.33 | 0.0029 | 0.0032 | 0.0022 | 0.0017 | 0.0019 | — | 2.103 |
| a10 | 0.0031 | 0.48 | 0.98 | 0.0013 | 0.31 | 0.0022 | 0.0013 | 0.0033 | 0.0018 | 0.0021 | — | 2.098 |
| a11 | 0.0029 | 0.35 | 0.54 | 0.0015 | 0.25 | 0.0028 | 0.0014 | 0.0021 | 0.0032 | 0.0027 | — | 2.116 |
| a12 | 0.0021 | 0.67 | 0.78 | 0.0047 | 0.29 | 0.0021 | 0.0016 | 0.0011 | 0.0013 | 0.0031 | — | 2.095 |
| a13 | 0.0014 | 0.49 | 0.49 | 0.0018 | 0.55 | 0.0011 | 0.0004 | 0.0005 | 0.0005 | 0.0015 | 0.050 | 2.093 |
| a14 | 0.0015 | 0.49 | 0.48 | 0.0014 | 0.20 | 0.0011 | 0.0005 | 0.0004 | 0.0005 | 0.0014 | 0.040 | 2.114 |

TABLE 2A

| No. | STEEL TYPE | SATURATION FLUX DENSITY Bs | PRODUCTION CONDITIONS | | | | | | | |
|---|---|---|---|---|---|---|---|---|---|---|
| | | | HOT ROLLING | | | | | | | |
| | | | SLAB HEATING | | REDUCTION OF FINAL PASS | HOLDING AFTER HOT ROLLING | | FINAL ANNEALING | |
| | | | HOLDING TEMPERATURE ° C. | HOLDING TIME min. | IN FINAL HOT ROLLING % | HOLDING TEMPERATURE ° C. | HOLDING TIME min. | HEATING RATE ° C./sec. | HOLDING TIME ° C. |
| D1 | A1 | 2.135 | 1154 | 20 | 21 | 821 | 15 | 20 | 825 |
| D2 | A1 | 2.135 | 1194 | 15 | 28 | 883 | 20 | 25 | 845 |
| D3 | A1 | 2.135 | 1161 | 10 | 22 | 854 | 30 | 30 | 810 |
| D4 | A1 | 2.135 | 1191 | 20 | 21 | 811 | 20 | 35 | 800 |
| D5 | A1 | 2.135 | 1188 | 30 | 25 | 899 | 30 | 20 | 825 |
| D6 | A1 | 2.135 | 1155 | 35 | 28 | 876 | 15 | 25 | 845 |
| D7 | A1 | 2.135 | 1167 | 40 | 24 | 855 | 20 | 30 | 810 |
| D8 | A11 | 2.111 | 1154 | 20 | 21 | 821 | 15 | 20 | 825 |
| D9 | A11 | 2.111 | 1194 | 15 | 20 | 883 | 20 | 25 | 845 |
| D10 | A11 | 2.111 | 1161 | 10 | 28 | 854 | 30 | 30 | 810 |
| D11 | A11 | 2.111 | 1191 | 20 | 22 | 811 | 20 | 20 | 825 |
| D12 | A11 | 2.111 | 1188 | 30 | 24 | 899 | 30 | 25 | 845 |
| D13 | A11 | 2.111 | 1155 | 35 | 22 | 876 | 15 | 30 | 810 |
| D14 | A11 | 2.111 | 1167 | 40 | 27 | 855 | 20 | 20 | 825 |
| D15 | A15 | 2.111 | 1154 | 20 | 28 | 821 | 15 | 25 | 845 |
| D16 | A15 | 2.111 | 1194 | 15 | 25 | 883 | 20 | 30 | 810 |

TABLE 2B

| No. | STEEL TYPE | SATURATION FLUX DENSITY Bs | PRODUCTION CONDITIONS | | | | | | |
|---|---|---|---|---|---|---|---|---|---|
| | | | HOT ROLLING | | | | | | |
| | | | SLAB HEATING | | REDUCTION OF FINAL PASS | HOLDING AFTER HOT ROLLING | | FINAL ANNEALING | |
| | | | HOLDING TEMPERATURE ° C. | HOLDING TIME min. | IN FINAL HOT ROLLING % | HOLDING TEMPERATURE ° C. | HOLDING TIME min. | HEATING RATE ° C./sec. | HOLDING TIME ° C. |
| d1 | A1 | 2.135 | 1145 | 20 | 20 | 820 | 30 | 20 | 825 |
| d2 | A1 | 2.135 | 1210 | 10 | 25 | 834 | 20 | 25 | 845 |
| d3 | A1 | 2.135 | 1155 | 5 | 25 | 865 | 10 | 30 | 810 |
| d4 | A1 | 2.135 | 1163 | 15 | 20 | 790 | 25 | 35 | 800 |
| d5 | A1 | 2.135 | 1189 | 10 | 30 | 910 | 15 | 20 | 825 |
| d6 | A1 | 2.135 | 1193 | 20 | 20 | 895 | 5 | 25 | 845 |

TABLE 2B-continued

| | | | PRODUCTION CONDITIONS | | | | | | |
|---|---|---|---|---|---|---|---|---|---|
| | | | HOT ROLLING | | | | | | |
| | | SATURATION | SLAB HEATING | | REDUCTION OF FINAL PASS | HOLDING AFTER HOT ROLLING | | FINAL ANNEALING | |
| No. | STEEL TYPE | FLUX DENSITY Bs | HOLDING TEMPERATURE ° C. | HOLDING TIME min. | IN FINAL HOT ROLLING % | HOLDING TEMPERATURE ° C. | HOLDING TIME min. | HEATING RATE ° C./sec. | HOLDING TIME ° C. |
| d7 | a2 | 2.070 | 1145 | 20 | 25 | 820 | 30 | 30 | 810 |
| d8 | a2 | 2.070 | 1210 | 10 | 25 | 834 | 20 | 30 | 810 |
| d9 | a2 | 2.070 | 1155 | 5 | 25 | 865 | 10 | 20 | 825 |
| d10 | a2 | 2.070 | 1163 | 15 | 30 | 790 | 25 | 25 | 845 |
| d11 | a2 | 2.070 | 1189 | 10 | 25 | 910 | 15 | 30 | 810 |
| d12 | a2 | 2.070 | 1193 | 20 | 30 | 895 | 5 | 35 | 800 |

TABLE 2C

| | | | PRODUCTION CONDITIONS | | | | | | |
|---|---|---|---|---|---|---|---|---|---|
| | | | HOT ROLLING | | | | | | |
| | | SATURATION | SLAB HEATING | | REDUCTION OF FINAL PASS | HOLDING AFTER HOT ROLLING | | FINAL ANNEALING | |
| No. | STEEL TYPE | FLUX DENSITY Bs | HOLDING TEMPERATURE ° C. | HOLDING TIME min. | IN FINAL HOT ROLLING % | HOLDING TEMPERATURE ° C. | HOLDING TIME min. | HEATING RATE ° C./sec. | HOLDING TIME ° C. |
| E1 | A2 | 2.130 | 1154 | 20 | 20 | 821 | 15 | 20 | 825 |
| E2 | A2 | 2.130 | 1194 | 15 | 20 | 883 | 20 | 25 | 845 |
| E3 | A3 | 2.119 | 1161 | 10 | 20 | 854 | 30 | 30 | 810 |
| E4 | A3 | 2.119 | 1191 | 20 | 25 | 811 | 20 | 35 | 800 |
| E5 | A4 | 2.105 | 1188 | 30 | 25 | 899 | 30 | 20 | 825 |
| E6 | A4 | 2.105 | 1155 | 35 | 25 | 876 | 15 | 25 | 845 |
| E7 | A5 | 2.110 | 1167 | 40 | 25 | 855 | 20 | 30 | 810 |
| E8 | A5 | 2.110 | 1178 | 25 | 25 | 845 | 30 | 35 | 800 |
| E9 | A6 | 2.141 | 1154 | 20 | 30 | 821 | 15 | 20 | 825 |
| E10 | A7 | 2.114 | 1194 | 15 | 30 | 883 | 20 | 25 | 845 |
| E11 | A8 | 2.127 | 1161 | 10 | 30 | 854 | 30 | 30 | 810 |
| E12 | A9 | 2.127 | 1191 | 20 | 30 | 811 | 20 | 35 | 800 |
| E13 | A10 | 2.125 | 1188 | 30 | 30 | 899 | 30 | 20 | 825 |
| E14 | A12 | 2.104 | 1155 | 35 | 30 | 876 | 15 | 25 | 845 |
| E15 | A13 | 2.115 | 1167 | 40 | 25 | 855 | 20 | 30 | 810 |
| E16 | A14 | 2.119 | 1178 | 25 | 25 | 845 | 30 | 35 | 800 |
| E17 | A16 | 2.115 | 1154 | 20 | 25 | 821 | 15 | 20 | 825 |

TABLE 2D

| | | | PRODUCTION CONDITIONS | | | | | | |
|---|---|---|---|---|---|---|---|---|---|
| | | | HOT ROLLING | | | | | | |
| | | SATURATION | SLAB HEATING | | REDUCTION OF FINAL PASS | HOLDING AFTER HOT ROLLING | | FINAL ANNEALING | |
| No. | STEEL TYPE | FLUX DENSITY Bs | HOLDING TEMPERATURE ° C. | HOLDING TIME min. | IN FINAL HOT ROLLING % | HOLDING TEMPERATURE ° C. | HOLDING TIME min. | HEATING RATE ° C./sec. | HOLDING TIME ° C. |
| e1 | a1 | 2.124 | 1145 | 20 | 5 | 820 | 30 | 15 | 820 |
| e2 | a3 | 2.083 | 1210 | 10 | 5 | 834 | 20 | 20 | 860 |
| e3 | a4 | 2.082 | 1155 | 5 | 10 | 865 | 10 | 15 | 820 |
| e4 | a5 | 2.092 | 1163 | 15 | 10 | 790 | 25 | 20 | 860 |
| e5 | a6 | 2.109 | 1189 | 10 | 15 | 910 | 15 | 15 | 820 |
| e6 | a7 | 2.073 | 1193 | 20 | 5 | 895 | 5 | 20 | 860 |
| e7 | a8 | 2.105 | 1145 | 20 | 5 | 820 | 30 | 15 | 820 |
| e8 | a9 | 2.103 | 1210 | 10 | 10 | 834 | 20 | 20 | 860 |
| e9 | a10 | 2.098 | 1155 | 5 | 15 | 865 | 10 | 15 | 820 |

TABLE 2D-continued

| No. | STEEL TYPE | SATURATION FLUX DENSITY Bs | PRODUCTION CONDITIONS / HOT ROLLING / SLAB HEATING HOLDING TEMPERATURE ° C. | SLAB HEATING HOLDING TIME min. | REDUCTION OF FINAL PASS IN FINAL HOT ROLLING % | HOLDING AFTER HOT ROLLING HOLDING TEMPERATURE ° C. | HOLDING AFTER HOT ROLLING HOLDING TIME min. | FINAL ANNEALING HEATING RATE ° C./sec. | FINAL ANNEALING HOLDING TIME ° C. |
|---|---|---|---|---|---|---|---|---|---|
| e10 | a11 | 2.116 | 1163 | 15 | 15 | 790 | 25 | 20 | 860 |
| e11 | a12 | 2.095 | 1189 | 10 | 5 | 910 | 15 | 15 | 820 |
| e12 | A2 | 2.130 | 1194 | 15 | 10 | 883 | 20 | 25 | 845 |
| e13 | A3 | 2.119 | 1161 | 10 | 5 | 854 | 30 | 30 | 810 |
| e14 | A3 | 2.119 | 1191 | 20 | 15 | 811 | 20 | 35 | 800 |
| e15 | A4 | 2.105 | 1188 | 30 | 5 | 899 | 30 | 20 | 825 |
| e16 | A2 | 2.130 | 1190 | 20 | 35 | 850 | 20 | 30 | 810 |
| e17 | A3 | 2.119 | 1180 | 20 | 25 | 860 | 40 | 25 | 845 |

TABLE 2E

| No. | STEEL TYPE | SATURATION FLUX DENSITY Bs | PRODUCTION CONDITIONS / HOT ROLLING / SLAB HEATING HOLDING TEMPERATURE ° C. | SLAB HEATING HOLDING TIME min. | REDUCTION OF FINAL PASS IN FINAL HOT ROLLING % | HOLDING AFTER HOT ROLLING HOLDING TEMPERATURE ° C. | HOLDING AFTER HOT ROLLING HOLDING TIME min. | FINAL ANNEALING HEATING RATE ° C./sec. | FINAL ANNEALING HOLDING TIME ° C. |
|---|---|---|---|---|---|---|---|---|---|
| f1 | a1 | 2.124 | 1150 | 20 | 20 | 820 | 30 | 20 | 820 |
| f2 | a3 | 2.083 | 1200 | 10 | 30 | 834 | 20 | 20 | 840 |
| f3 | a4 | 2.082 | 1155 | 10 | 20 | 865 | 30 | 30 | 830 |
| f4 | a5 | 2.092 | 1163 | 15 | 20 | 800 | 25 | 20 | 800 |
| f5 | a6 | 2.109 | 1189 | 10 | 20 | 900 | 15 | 30 | 820 |
| f6 | a7 | 2.073 | 1193 | 20 | 30 | 895 | 15 | 20 | 810 |
| f7 | a8 | 2.105 | 1160 | 20 | 20 | 820 | 30 | 20 | 820 |
| f8 | a9 | 2.103 | 1190 | 10 | 20 | 834 | 20 | 20 | 830 |
| f9 | a10 | 2.098 | 1155 | 15 | 20 | 865 | 20 | 30 | 820 |
| f10 | a11 | 2.116 | 1163 | 15 | 20 | 800 | 25 | 20 | 820 |
| f11 | a12 | 2.095 | 1189 | 10 | 20 | 900 | 15 | 20 | 820 |
| f12 | a13 | 2.093 | 1194 | 15 | 28 | 883 | 20 | 25 | 845 |
| f13 | a14 | 2.114 | 1191 | 20 | 21 | 811 | 20 | 35 | 800 |

TABLE 3A

| No. | STEEL TYPE | SATURATION FLUX DENSITY Bs | PRODUCTION RESULTS / Ti CARBIDES / COMPOSITELY PRECIPITATED WITH SULFIDES IN α GRAIN number % | Ti CARBIDES / INCOMPOSITELY PRECIPITATED IN α GRAIN PIECES/μm | AMOUNT OF SOLID SOLUTED Ti mass % | EVALUATION RESULTS / MAGNETIC FLUX DENSITY B50 T |
|---|---|---|---|---|---|---|
| D1 | A1 | 2.135 | 80 | 0.03 | 0.0003 | 1.765 |
| D2 | A1 | 2.135 | 90 | 0.05 | 0.0005 | 1.764 |
| D3 | A1 | 2.135 | 90 | 0.04 | 0.0002 | 1.766 |
| D4 | A1 | 2.135 | 80 | 0.08 | 0.0004 | 1.767 |
| D5 | A1 | 2.135 | 70 | 0.08 | 0.0005 | 1.768 |
| D6 | A1 | 2.135 | 80 | 0.06 | 0.0003 | 1.764 |
| D7 | A1 | 2.135 | 70 | 0.03 | 0.0002 | 1.765 |
| D8 | A11 | 2.111 | 60 | 0.02 | 0.0003 | 1.755 |
| D9 | A11 | 2.111 | 20 | 0.01 | 0.0004 | 1.753 |
| D10 | A11 | 2.111 | 30 | 0.03 | 0.0005 | 1.752 |
| D11 | A11 | 2.111 | 40 | 0.04 | 0.0003 | 1.755 |
| D12 | A11 | 2.111 | 30 | 0.05 | 0.0002 | 1.756 |
| D13 | A11 | 2.111 | 60 | 0.07 | 0.0002 | 1.757 |
| D14 | A11 | 2.111 | 50 | 0.05 | 0.0004 | 1.754 |

TABLE 3A-continued

| | | | | | | |
|---|---|---|---|---|---|---|
| D15 | A15 | 2.111 | 20 | 0.05 | 0.0005 | 1.751 |
| D16 | A15 | 2.111 | 10 | 0.03 | 0.0004 | 1.750 |

| | EVALUATION RESULTS | | | | |
|---|---|---|---|---|---|
| No. | IRON LOSS W15/50 W/Kg | IRON LOSS W15/60 W/Kg | B50/Bs | HYSTERESIS LOSS Wh15/50 W/Kg | NOTE |
| D1 | 4.23 | 5.56 | 0.827 | 2.21 | INVENTIVE EXAMPLE |
| D2 | 4.22 | 5.54 | 0.826 | 2.24 | INVENTIVE EXAMPLE |
| D3 | 4.23 | 5.56 | 0.827 | 2.21 | INVENTIVE EXAMPLE |
| D4 | 4.33 | 5.68 | 0.828 | 2.31 | INVENTIVE EXAMPLE |
| D5 | 4.43 | 5.80 | 0.828 | 2.41 | INVENTIVE EXAMPLE |
| D6 | 4.42 | 5.78 | 0.826 | 2.44 | INVENTIVE EXAMPLE |
| D7 | 4.33 | 5.68 | 0.827 | 2.31 | INVENTIVE EXAMPLE |
| D8 | 3.57 | 4.55 | 0.831 | 2.46 | INVENTIVE EXAMPLE |
| D9 | 3.45 | 4.40 | 0.831 | 2.37 | INVENTIVE EXAMPLE |
| D10 | 3.53 | 4.50 | 0.830 | 2.43 | INVENTIVE EXAMPLE |
| D11 | 3.44 | 4.39 | 0.831 | 2.35 | INVENTIVE EXAMPLE |
| D12 | 3.63 | 4.62 | 0.832 | 2.53 | INVENTIVE EXAMPLE |
| D13 | 3.34 | 4.27 | 0.832 | 2.25 | INVENTIVE EXAMPLE |
| D14 | 3.41 | 4.36 | 0.831 | 2.29 | INVENTIVE EXAMPLE |
| D15 | 3.32 | 4.22 | 0.829 | 2.34 | INVENTIVE EXAMPLE |
| D16 | 3.22 | 4.10 | 0.829 | 2.24 | INVENTIVE EXAMPLE |

TABLE 3B

| | | | PRODUCTION RESULTS | | | |
|---|---|---|---|---|---|---|
| | | | Ti CARBIDES | | | EVALUATION RESULTS |
| No | STEEL TYPE | SATURATION FLUX DENSITY Bs | COMPOSITELY PRECIPITATED WITH SULFIDES IN α GRAIN number % | INCOMPOSITELY PRECIPITATED IN α GRAIN PIECES/μm | AMOUNT OF SOLID SOLUTED Ti mass % | MAGNETIC FLUX DENSITY B50 T |
| d1 | A1 | 2.135 | 5 | 0.1 | 0.0012 | 1.700 |
| d2 | A1 | 2.135 | 4 | 0.2 | 0.0006 | 1.695 |
| d3 | A1 | 2.135 | 3 | 0.3 | 0.0010 | 1.704 |
| d4 | A1 | 2.135 | 2 | 0.4 | 0.0015 | 1.697 |
| d5 | A1 | 2.135 | 1 | 0.4 | 0.0012 | 1.685 |
| d6 | A1 | 2.135 | 2 | 0.5 | 0.0008 | 1.703 |
| d7 | a2 | 2.070 | 3 | 0.7 | 0.0011 | 1.691 |
| d8 | a2 | 2.070 | 4 | 0.9 | 0.0009 | 1.692 |
| d9 | a2 | 2.070 | 3 | 0.2 | 0.0008 | 1.694 |
| d10 | a2 | 2.070 | 4 | 0.3 | 0.0015 | 1.691 |
| d11 | a2 | 2.070 | 3 | 0.4 | 0.0018 | 1.682 |
| d12 | a2 | 2.070 | 5 | 0.2 | 0.0008 | 1.691 |

TABLE 3B-continued

| No | EVALUATION RESULTS IRON LOSS W15/50 W/Kg | IRON LOSS W15/60 W/Kg | B50/Bs | HYSTERESIS LOSS Wh15/50 W/Kg | NOTE |
|---|---|---|---|---|---|
| d1 | 4.53 | 5.92 | 0.796 | 2.51 | COMPARATIVE EXAMPLE |
| d2 | 4.55 | 5.94 | 0.794 | 2.55 | COMPARATIVE EXAMPLE |
| d3 | 4.65 | 6.06 | 0.798 | 2.65 | COMPARATIVE EXAMPLE |
| d4 | 4.45 | 5.82 | 0.795 | 2.45 | COMPARATIVE EXAMPLE |
| d5 | 4.47 | 5.84 | 0.789 | 2.49 | COMPARATIVE EXAMPLE |
| d6 | 4.59 | 5.99 | 0.798 | 2.58 | COMPARATIVE EXAMPLE |
| d7 | 5.45 | 6.78 | 0.817 | 4.45 | COMPARATIVE EXAMPLE |
| d8 | 5.33 | 6.64 | 0.817 | 4.31 | COMPARATIVE EXAMPLE |
| d9 | 5.52 | 6.86 | 0.818 | 4.54 | COMPARATIVE EXAMPLE |
| d10 | 5.42 | 6.74 | 0.817 | 4.44 | COMPARATIVE EXAMPLE |
| d11 | 5.76 | 7.15 | 0.812 | 4.77 | COMPARATIVE EXAMPLE |
| d12 | 5.53 | 6.88 | 0.817 | 4.51 | COMPARATIVE EXAMPLE |

TABLE 3C

| | | | PRODUCTION RESULTS | | | EVALUATION RESULTS |
|---|---|---|---|---|---|---|
| | | | Ti CARBIDES | | | |
| No. | STEEL TYPE | SATURATION FLUX DENSITY Bs | COMPOSITELY PRECIPITATED WITH SULFIDES IN α GRAIN number % | INCOMPOSITELY PRECIPITATED IN α GRAIN PIECES/μm | AMOUNT OF SOLID SOLUTED Ti mass % | MAGNETIC FLUX DENSITY B50 T |
| E1 | A2 | 2.130 | 20 | 0.02 | 0.0002 | 1.748 |
| E2 | A2 | 2.130 | 30 | 0.03 | 0.0005 | 1.747 |
| E3 | A3 | 2.119 | 40 | 0.04 | 0.0004 | 1.766 |
| E4 | A3 | 2.119 | 40 | 0.03 | 0.0003 | 1.767 |
| E5 | A4 | 2.105 | 50 | 0.02 | 0.0003 | 1.755 |
| E6 | A4 | 2.105 | 70 | 0.07 | 0.0002 | 1.756 |
| E7 | A5 | 2.110 | 90 | 0.06 | 0.0001 | 1.752 |
| E8 | A5 | 2.110 | 65 | 0.08 | 0.0004 | 1.753 |
| E9 | A6 | 2.141 | 70 | 0.06 | 0.0003 | 1.758 |
| E10 | A7 | 2.114 | 40 | 0.04 | 0.0002 | 1.747 |
| E11 | A8 | 2.127 | 20 | 0.08 | 0.0003 | 1.745 |
| E12 | A9 | 2.127 | 30 | 0.03 | 0.0003 | 1.745 |
| E13 | A10 | 2.125 | 30 | 0.04 | 0.0003 | 1.747 |
| E14 | A12 | 2.104 | 60 | 0.07 | 0.0002 | 1.752 |
| E15 | A13 | 2.115 | 70 | 0.07 | 0.0005 | 1.758 |
| E16 | A14 | 2.119 | 50 | 0.06 | 0.0003 | 1.748 |
| E17 | A16 | 2.115 | 10 | 0.06 | 0.0002 | 1.743 |

| No. | EVALUATION RESULTS IRON LOSS W15/50 W/Kg | IRON LOSS W15/60 W/Kg | B50/Bs | HYSTERESIS LOSS Wh15/50 W/Kg | NOTE |
|---|---|---|---|---|---|
| E1 | 3.22 | 4.10 | 0.821 | 2.24 | INVENTIVE EXAMPLE |
| E2 | 3.23 | 4.12 | 0.820 | 2.21 | INVENTIVE EXAMPLE |
| E3 | 3.87 | 5.05 | 0.833 | 2.18 | INVENTIVE EXAMPLE |
| E4 | 4.21 | 5.46 | 0.834 | 2.51 | INVENTIVE EXAMPLE |

TABLE 3C-continued

| | | | | | |
|---|---|---|---|---|---|
| E5 | 3.23 | 4.14 | 0.834 | 2.13 | INVENTIVE EXAMPLE |
| E6 | 3.11 | 4.00 | 0.834 | 1.99 | INVENTIVE EXAMPLE |
| E7 | 3.75 | 4.79 | 0.830 | 2.54 | INVENTIVE EXAMPLE |
| E8 | 3.67 | 4.69 | 0.831 | 2.48 | INVENTIVE EXAMPLE |
| E9 | 3.38 | 4.37 | 0.821 | 2.07 | INVENTIVE EXAMPLE |
| E10 | 3.44 | 4.37 | 0.827 | 2.43 | INVENTIVE EXAMPLE |
| E11 | 3.54 | 4.51 | 0.820 | 2.45 | INVENTIVE EXAMPLE |
| E12 | 3.33 | 4.26 | 0.820 | 2.23 | INVENTIVE EXAMPLE |
| E13 | 3.67 | 4.67 | 0.822 | 2.56 | INVENTIVE EXAMPLE |
| E14 | 3.59 | 4.57 | 0.833 | 2.50 | INVENTIVE EXAMPLE |
| E15 | 3.77 | 4.84 | 0.831 | 2.45 | INVENTIVE EXAMPLE |
| E16 | 3.51 | 4.50 | 0.825 | 2.31 | INVENTIVE EXAMPLE |
| E17 | 3.24 | 4.13 | 0.824 | 2.23 | INVENTIVE EXAMPLE |

TABLE 3D

| | | | PRODUCTION RESULTS | | | EVALUATION RESULTS |
|---|---|---|---|---|---|---|
| | | | Ti CARBIDES | | | |
| No. | STEEL TYPE | SATURATION FLUX DENSITY Bs | COMPOSITELY PRECIPITATED WITH SULFIDES IN α GRAIN number % | INCOMPOSITELY PRECIPITATED IN α GRAIN PIECES/μm | AMOUNT OF SOLID SOLUTED Ti mass % | MAGNETIC FLUX DENSITY B50 T |
| e1 | a1 | 2.124 | 5 | 1.0 | 0.0012 | 1.688 |
| e2 | a3 | 2.083 | 4 | 2.0 | 0.0006 | 1.671 |
| e3 | a4 | 2.082 | 3 | 4.0 | 0.0008 | 1.677 |
| e4 | a5 | 2.092 | 2 | 5.0 | 0.0009 | 1.697 |
| e5 | a6 | 2.109 | 3 | 3.0 | 0.0011 | 1.699 |
| e6 | a7 | 2.073 | 4 | 2.0 | 0.0012 | 1.689 |
| e7 | a8 | 2.105 | 5 | 6.0 | 0.0013 | 1.688 |
| e8 | a9 | 2.103 | 6 | 8.0 | 0.0011 | 1.690 |
| e9 | a10 | 2.098 | 7 | 4.0 | 0.0012 | 1.702 |
| e10 | a11 | 2.116 | 2 | 3.0 | 0.0014 | 1.701 |
| e11 | a12 | 2.095 | 4 | 2.0 | 0.0011 | 1.688 |
| e12 | A2 | 2.130 | 5 | 1.0 | 0.0005 | 1.745 |
| e13 | A3 | 2.119 | 7 | 4.0 | 0.0004 | 1.764 |
| e14 | A3 | 2.119 | 4 | 2.0 | 0.0003 | 1.654 |
| e15 | A4 | 2.105 | 2 | 3.0 | 0.0003 | 1.751 |
| e16 | A2 | 2.130 | 7 | 2.0 | 0.0005 | 1.750 |
| e17 | A3 | 2.119 | 8 | 1.0 | 0.0004 | 1.748 |

| | EVALUATION RESULTS | | | | |
|---|---|---|---|---|---|
| No. | IRON LOSS W15/50 W/Kg | IRON LOSS W15/60 W/Kg | B50/Bs | HYSTERESIS LOSS Wh15/50 W/Kg | NOTE |
| e1 | 4.89 | 6.28 | 0.795 | 3.17 | COMPARATIVE EXAMPLE |
| e2 | 4.76 | 5.98 | 0.802 | 3.64 | COMPARATIVE EXAMPLE |
| e3 | 4.79 | 6.01 | 0.806 | 3.70 | COMPARATIVE EXAMPLE |
| e4 | 4.66 | 5.88 | 0.811 | 3.46 | COMPARATIVE EXAMPLE |
| e5 | 4.84 | 6.14 | 0.806 | 3.46 | COMPARATIVE EXAMPLE |
| e6 | 4.78 | 6.00 | 0.815 | 3.68 | COMPARATIVE EXAMPLE |
| e7 | 4.68 | 5.95 | 0.802 | 3.29 | COMPARATIVE EXAMPLE |
| e8 | 4.89 | 6.18 | 0.804 | 3.59 | COMPARATIVE EXAMPLE |
| e9 | 4.66 | 5.90 | 0.811 | 3.38 | COMPARATIVE EXAMPLE |
| e10 | 4.56 | 5.86 | 0.804 | 2.94 | COMPARATIVE EXAMPLE |
| e11 | 4.73 | 5.96 | 0.806 | 3.55 | COMPARATIVE EXAMPLE |
| e12 | 5.88 | 7.65 | 0.819 | 3.41 | COMPARATIVE EXAMPLE |

TABLE 3D-continued

| | | | | | |
|---|---|---|---|---|---|
| e13 | 5.90 | 7.60 | 0.832 | 3.73 | COMPARATIVE EXAMPLE |
| e14 | 6.21 | 8.15 | 0.781 | 3.30 | COMPARATIVE EXAMPLE |
| e15 | 6.11 | 8.03 | 0.832 | 3.20 | COMPARATIVE EXAMPLE |
| e16 | 5.78 | 7.58 | 0.822 | 3.10 | COMPARATIVE EXAMPLE |
| e17 | 5.75 | 7.55 | 0.825 | 3.04 | COMPARATIVE EXAMPLE |

TABLE 3E

| | | | PRODUCTION RESULTS | | | EVALUATION RESULTS |
|---|---|---|---|---|---|---|
| | | | Ti CARBIDES | | | |
| No. | STEEL TYPE | SATURATION FLUX DENSITY Bs | COMPOSITELY PRECIPITATED WITH SULFIDES IN α GRAIN number % | INCOMPOSITELY PRECIPITATED IN α GRAIN PIECES/μm | AMOUNT OF SOLID SOLUTED Ti mass % | MAGNETIC FLUX DENSITY B50 T |
| f1 | a1 | 2.124 | 4 | 2.0 | 0.0011 | 1.690 |
| f2 | a3 | 2.083 | 6 | 5.0 | 0.0008 | 1.675 |
| f3 | a4 | 2.082 | 8 | 8.0 | 0.0012 | 1.675 |
| f4 | a5 | 2.092 | 4 | 5.0 | 0.0011 | 1.699 |
| f5 | a6 | 2.109 | 3 | 3.0 | 0.0011 | 1.697 |
| f6 | a7 | 2.073 | 6 | 5.0 | 0.0012 | 1.685 |
| f7 | a8 | 2.105 | 8 | 3.0 | 0.0013 | 1.676 |
| f8 | a9 | 2.103 | 7 | 4.0 | 0.0011 | 1.687 |
| f9 | a10 | 2.098 | 3 | 2.0 | 0.0012 | 1.703 |
| f10 | a11 | 2.116 | 2 | 1.0 | 0.0014 | 1.703 |
| f11 | a12 | 2.095 | 5 | 3.0 | 0.0011 | 1.689 |
| f12 | a13 | 2.093 | 3 | 0.6 | 0.0008 | 1.704 |
| f13 | a14 | 2.114 | 8 | 3.0 | 0.0004 | 1.764 |

| | EVALUATION RESULTS | | | | |
|---|---|---|---|---|---|
| No. | IRON LOSS W15/50 W/Kg | IRON LOSS W15/60 W/Kg | B50/Bs | HYSTERESIS LOSS Wh15/50 W/Kg | NOTE |
| f1 | 4.92 | 6.34 | 0.796 | 3.10 | COMPARATIVE EXAMPLE |
| f2 | 4.78 | 5.99 | 0.804 | 3.72 | COMPARATIVE EXAMPLE |
| f3 | 4.77 | 6.03 | 0.805 | 3.49 | COMPARATIVE EXAMPLE |
| f4 | 4.69 | 5.89 | 0.812 | 3.60 | COMPARATIVE EXAMPLE |
| f5 | 4.89 | 6.11 | 0.805 | 3.88 | COMPARATIVE EXAMPLE |
| f6 | 4.77 | 6.02 | 0.813 | 3.54 | COMPARATIVE EXAMPLE |
| f7 | 4.66 | 5.97 | 0.796 | 3.09 | COMPARATIVE EXAMPLE |
| f8 | 4.81 | 6.15 | 0.802 | 3.24 | COMPARATIVE EXAMPLE |
| f9 | 4.65 | 5.94 | 0.812 | 3.15 | COMPARATIVE EXAMPLE |
| f10 | 4.55 | 5.89 | 0.805 | 2.76 | COMPARATIVE EXAMPLE |
| f11 | 4.75 | 5.99 | 0.806 | 3.54 | COMPARATIVE EXAMPLE |
| f12 | 4.58 | 5.98 | 0.814 | 2.56 | COMPARATIVE EXAMPLE |
| f13 | 5.87 | 7.59 | 0.834 | 3.60 | COMPARATIVE EXAMPLE |

According to the above aspects of the present invention, it is possible to provide the hot rolled steel sheet for the non oriented electrical steel sheet which achieves both low iron loss and high magnetic flux density even when the chemical composition is limited, and the producing method thereof. Accordingly, the present invention has significant industrial applicability.

The invention claimed is:

1. A hot rolled steel sheet for a non oriented electrical steel sheet, the hot rolled steel sheet comprising, as a chemical composition, by mass %, 0.0010 to 0.0050% of C, 0.1 to less than 0.5% of Si, 0.1 to 0.5% of Mn, 0.1 to 0.5% of Al, 0.0010 to 0.0030% of total-Ti, 0.0010 to 0.0030% of N, more than 0.0015 to 0.0040% of S, 0 to 0.0030% of Nb, 0 to 0.0030% of V, 0 to 0.0030% of Zr, 0 to 0.100% of Sn, and a balance consisting of Fe and impurities, wherein an amount of solid-soluted Ti is 0.0005% or less, at an observed surface which is parallel to a rolling direction and a transverse direction, Ti carbides with an equivalent circle diameter of 10 to 50 nm exist in a grain and at a grain boundary of a ferrite grain, 10 to 100 number % of the Ti carbides which exist in the grain are compositely precipitated with a Mn sulfide, and a number density of the Ti carbides which exist at the grain boundary is 0.1 pieces/μm or less.

2. The hot rolled steel sheet for the non oriented electrical steel sheet according to claim 1, the hot rolled steel sheet comprising, as the chemical composition, by mass %, 0.010 to 0.100% of Sn.

3. A producing method of the hot rolled steel sheet for the non oriented electrical steel sheet according to claim 1, the method comprising a casting process of casting a molten steel to obtain a slab including, as a chemical composition, by mass %, 0.0010 to 0.0050% of C, 0.1 to less than 0.5% of Si, 0.1 to 0.5% of Mn, 0.1 to 0.5% of Al, 0.0010 to 0.0030% of total-Ti, 0.0010 to 0.0030% of N, more than 0.0015 to 0.0040% of S, 0 to 0.0030% of Nb, 0 to 0.0030% of V, 0 to 0.0030% of Zr, 0 to 0.100% of Sn, and a balance consisting of Fe and impurities, and a hot rolling process of hot-rolling the slab to obtain a hot rolled steel sheet, wherein in the hot rolling process, the slab before hot rolling is heated and held in a temperature range of 1150 to 1200° C. for 10 to 60 minutes, a final pass with a reduction of 20 to 30% is conducted in a final hot rolling, and a steel sheet after hot rolling is held in a temperature range of 800 to less than 900° C. for 15 to 30 minutes.

4. A producing method of the hot rolled steel sheet for the non oriented electrical steel sheet according to claim 2, the method comprising a casting process of casting a molten steel to obtain a slab including, as a chemical composition, by mass %, 0.0010 to 0.0050% of C, 0.1 to less than 0.5% of Si, 0.1 to 0.5% of Mn, 0.1 to 0.5% of Al, 0.0010 to 0.0030% of total-Ti, 0.0010 to 0.0030% of N, more than 0.0015 to 0.0040% of S, 0 to 0.0030% of Nb, 0 to 0.0030% of V, 0 to 0.0030% of Zr, 0 to 0.100% of Sn, and a balance consisting of Fe and impurities, and a hot rolling process of hot-rolling the slab to obtain a hot rolled steel sheet, wherein in the hot rolling process, the slab before hot rolling is heated and held in a temperature range of 1150 to 1200° C. for 10 to 60 minutes, a final pass with a reduction of 20 to 30% is conducted in a final hot rolling, and a steel sheet after hot rolling is held in a temperature range of 800 to less than 900° C. for 15 to 30 minutes.

5. A hot rolled steel sheet for a non oriented electrical steel sheet, the hot rolled steel sheet comprising, as a chemical composition, by mass %, 0.0010 to 0.0050% of C, 0.1 to less than 0.5% of Si, 0.1 to 0.5% of Mn, 0.1 to 0.5% of Al, 0.0010 to 0.0030% of total-Ti, 0.0010 to 0.0030% of N, more than 0.0015 to 0.0040% of S, 0 to 0.0030% of Nb, 0 to 0.0030% of V, 0 to 0.0030% of Zr, 0 to 0.100% of Sn, and a balance being Fe and impurities, wherein an amount of solid-soluted Ti is 0.0005% or less, at an observed surface which is parallel to a rolling direction and a transverse direction, Ti carbides with an equivalent circle diameter of 10 to 50 nm exist in a grain and at a grain boundary of a ferrite grain, 10 to 100 number % of the Ti carbides which exist in the grain are compositely precipitated with a Mn sulfide, and a number density of the Ti carbides which exist at the grain boundary is 0.1 pieces/μm or less.

6. A producing method of the hot rolled steel sheet for the non oriented electrical steel sheet according to claim 5, the method comprising a casting process of casting a molten steel to obtain a slab including, as a chemical composition, by mass %, 0.0010 to 0.0050% of C, 0.1 to less than 0.5% of Si, 0.1 to 0.5% of Mn, 0.1 to 0.5% of Al, 0.0010 to 0.0030% of total-Ti, 0.0010 to 0.0030% of N, more than 0.0015 to 0.0040% of S, 0 to 0.0030% of Nb, 0 to 0.0030% of V, 0 to 0.0030% of Zr, 0 to 0.100% of Sn, and a balance being Fe and impurities, and a hot rolling process of hot-rolling the slab to obtain a hot rolled steel sheet, wherein in the hot rolling process, the slab before hot rolling is heated and held in a temperature range of 1150 to 1200° C. for 10 to 60 minutes, a final pass with a reduction of 20 to 30% is conducted in a final hot rolling, and a steel sheet after hot rolling is held in a temperature range of 800 to less than 900° C. for 15 to 30 minutes.

* * * * *